Figure 1:
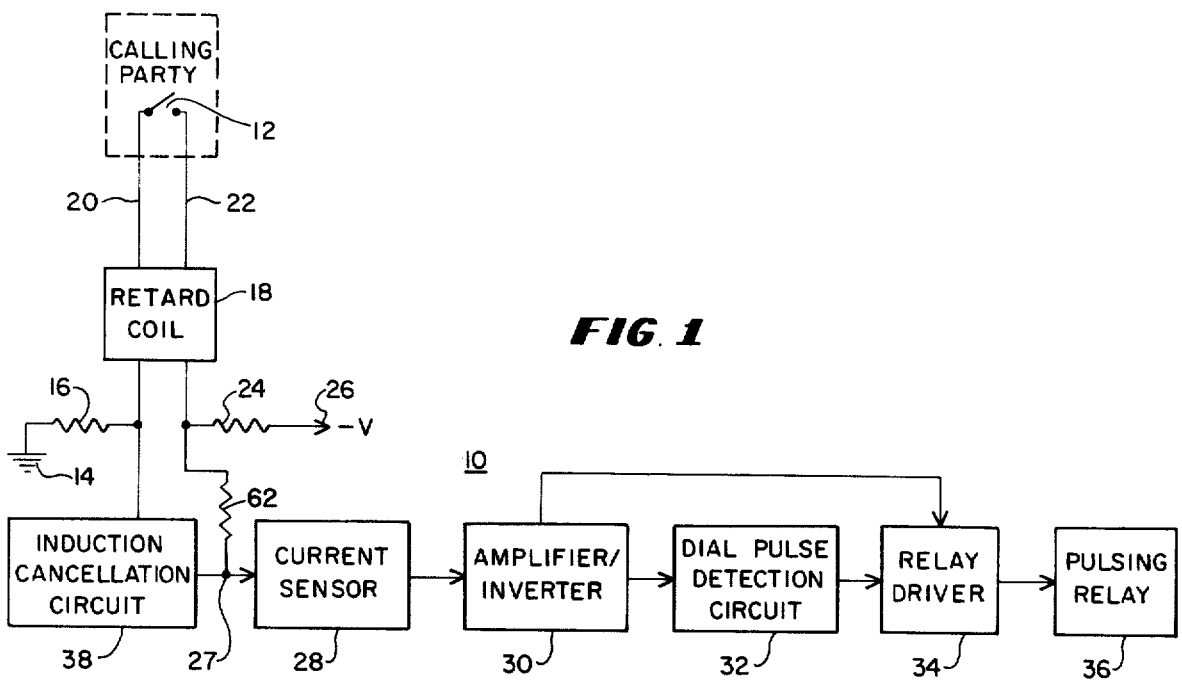

United States Patent [19]

Fleuchaus et al.

[11] 3,932,713
[45] Jan. 13, 1976

[54] INDUCTION CANCELLATION CIRCUIT

[75] Inventors: Albert C. Fleuchaus, Wheeling; Paul Shylo, Norridge, both of Ill.

[73] Assignee: Cook Electric Company, Morton Grove, Ill.

[22] Filed: May 15, 1974

[21] Appl. No.: 470,074

[52] U.S. Cl. ................ 179/174; 178/69 B; 333/12
[51] Int. Cl.² ........................................ H04M 1/74
[58] Field of Search ......... 179/174, 80, 78 R, 78 A, 179/79; 333/12; 323/22 T; 178/69 B

[56] References Cited
UNITED STATES PATENTS

| | | | |
|---|---|---|---|
| 2,294,627 | 9/1942 | Parr, Jr. ........................ | 179/78 R |
| 2,338,399 | 1/1944 | Bingley ......................... | 178/69 B |
| 3,719,904 | 3/1973 | Bragg ........................... | 333/12 |

*Primary Examiner*—Thomas A. Robinson
*Attorney, Agent, or Firm*—Mason, Kolehmainen, Rathburn & Wyss

[57] ABSTRACT

An induction cancellation circuit is used to minimize the effects of AC induced signals appearing on a pair of telephone lines on the activation of a current sensor by a DC loop current flowing on the telephone lines. An input of the current sensor is coupled to one of the telephone lines by a coupling resistor so as to receive energizing potentials from both the AC induced signals and the DC loop current. On the other hand, the having an cancellation circuit includes an amplifier having an amplifier input coupled to the other telephone line by a DC blocking capacitor. The amplifier is biased at unity gain and provides an output signal equal to but 180° out of phase with the AC induced signals received at its input. The output signal is coupled through a balancing resistor and another capacitor to the input of the current sensor such that the out of phase output signal and the AC induced signal received at the input of a current sensor via the coupling resistor effectively cancel each other because the balancing resistor and the output impedance of the amplifier are substantially equal to the coupling resistor.

7 Claims, 2 Drawing Figures

INDUCTION CANCELLATION CIRCUIT

The present invention relates to a loop dial long line unit for telephone equipment and, more particularly, to a new and improved induction cancellation circuit for the loop dial long line unit to effectively cancel induced noise signals appearing upon the tip and ring lines of a subscriber loop.

Loop dial long line units are designed to extend signaling, supervisory and dial pulsing limits of a PABX or telephone central office beyond its normal range, while maintaining continuity of the voice transmission path. Power is provided to the loop dial long line unit from the central office battery. The dial long line unit functions to connect a subscriber or calling party to the telephone central office by coupling a subscriber loop to the telephone office loop. The subscriber loop may have many induced noise signals, which appear as AC signals, induced upon both the tip and ring lines. The induced noise can be as a result of electrostatic induction, induction from adjacent power lines or magnetic induction. It is necessary to cancel these induced signals from the subscriber loop so that a portion of the dial long line unit, which senses current on the subscriber loop, is not affected by the induced noise signals.

In some instances in the past, the induced noise signals were cancelled by using a neutralizing transformer having oppositely polarized coils. Normally, these transformers were used with relays that were closed in response to dialing signals on the line which were not cancelled by the neutralizing transformer. However, the use of such relays and transformers is not satisfactory for use in solid state dial long line units.

Accordingly, objects of the present invention are to provide a new and improved induction cancellation circuit that is used with solid state dial long line units or the like; that is operable under high induction value conditions; and that operates notwithstanding the presence of high leakage or ringer loads on the tip and ring lines of a subscriber loop.

In accordance with these and many other objects of the present invention, an embodiment of the present invention includes an induction cancellation circuit coupling a telephone loop having tip and ring lines to a current sensor device which is actuated in response to a loop current flowing in the loop circuit. The induction cancellation circuit couples the AC induced signals or longitudinal voltage appearing on the tip line to the input of the current sensor by means of an inverting amplifier set at essentially unity gain and a balancing resistor. The induced voltage on the ring line also is coupled to the input of the current sensor through a coupling resistor. Since the impedance of the balancing resistor and output impedance of the amplifier is essentially equal to the impedance of the coupling resistor and the induced AC signal is a longitudinal voltage appearing in-phase on both the tip and ring lines, the mixing of the out of phase AC signal from the tip line with the AC signal from the ring line effectively cancels the AC signals at the input of the current sensor so that the current sensor is not affected by induced noise signals. On the other hand, when a loop current is flowing in the loop due to an offhook condition of a calling party, the induction cancellation circuit does not cancel the components on the tip and ring line and the current sensor is actuated.

Figure 2:
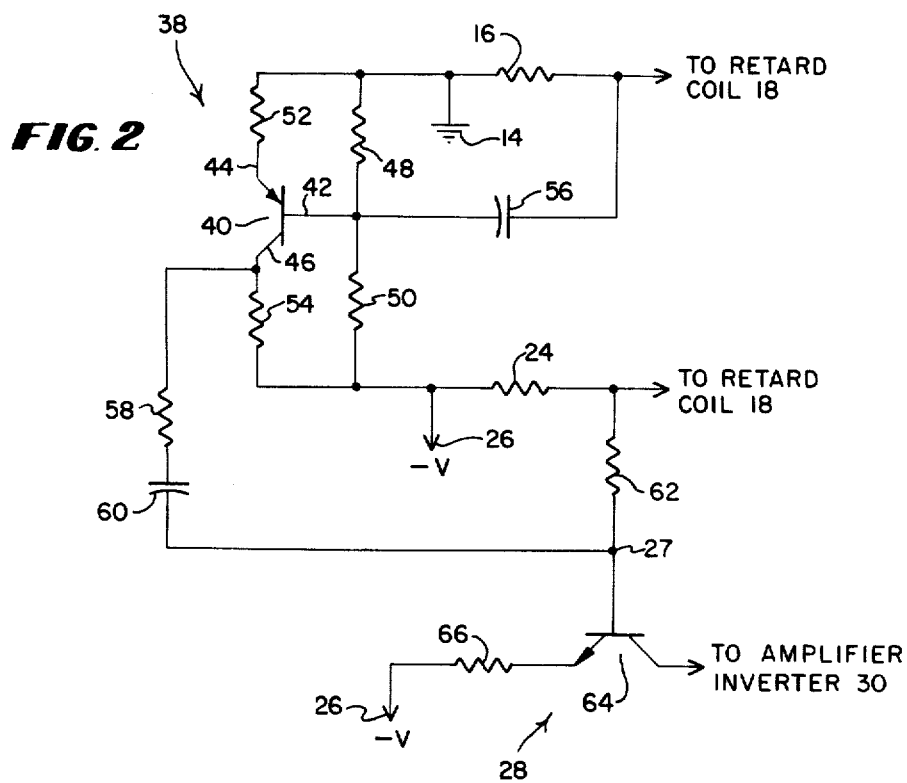

Many other objects of the present invention will become apparent from considering the following detailed description in conjunction with the drawings in which:

FIG. 1 is a block diagram of a portion of a loop dial long line unit including an induction cancellation circuit embodying the present invention; and FIG. 2 is a schematic diagram of the induction cancellation circuit embodying the present invention.

Referring now to FIG. 1 of the drawings, therein is disclosed a block diagram showing a portion of a loop dial long line unit designated generally as 10. The loop dial long line unit 10 is operated in response to a calling party going off-hook so that a subscriber loop is closed as diagrammatically represented by the closing of a switch 12. Upon the closure of the switch 12, a loop is formed from a ground terminal 14 through a resistor 16, a retard coil 18, a tip line 20, the closed switch 12, a ring line 22, another portion of the retard coil 18, and a resistor 24 to a negative battery terminal 26 of the central office battery. When a loop current is flowing in the loop circuit, an actuating signal is supplied to an input terminal 27 of a current sensor 28 which activates an amplifier inverter 30 and a dial pulse detection circuit 32. The amplifier inverter circuit 30 and the dial pulse detection circuit 32 turn on a relay driver 34 so as to operate a pulsing relay 36. When the pulsing relay 36 is operated, the loop circuit in the central office is connected to the subscriber loop by other portions of the dial long line unit (not shown). In the event the loop current flowing in the subscriber loop is interrupted by dialing at the dial pulse rate, the pulsing relay 36 is operated at the dial pulse rate due to the fact that the current sensor 28 also is being operated at the dial pulse rate.

In order to insure that the current sensor 28 is not actuated by AC noise signals appearing as a longitudinal voltage on the tip line 20 and the ring line 22, an induction cancellation circuit 38 embodying the present invention is coupled between the input 27 of the current sensor 28 and the tip line 20. The induction cancellation circuit 38 mixes an out of phase noise signal from the tip line 20 with the AC noise signal from the ring side 22 of the line so that the two signal components effectively cancel each other. Thus, the effect of the induced noise signal on the tip line 20 and the ring line 22 on the current sensor 28 is minimized.

The induction cancellation circuit 38 is shown in more detail in FIG. 2 of the drawings. More specifically, the induction cancellation circuit 38 includes a transistor 40 having a base electrode 42, an emitter electrode 44 and a collector electrode 46. A voltage divider formed by a resistor 48 coupled between the base electrode 42 and the ground terminal 14 and a resistor 50 coupled between the base electrode 42 and the negative battery terminal 26 supplies a DC biasing potential to the base electrode 42. A resistor 52 couples the emitter electrode 44 to the ground terminal 14 and the resistor 16. Another resistor 54, which is approximately equal in value to the resistor 52, couples the collector electrode 46 to the negative battery terminal 26. Since the resistors 52 and 54 are equal and the resistors 48 and 50 are selected to properly bias the base electrode 42 at the same potential as the emitter electrode 44, the transistor 40 is biased at substantially unity gain.

The base electrode 42 of the transistor 40 is coupled via a DC blocking capacitor 56 to the junction between the resistor 16 and the retard coil 18 such that the base electrode 42 is essentially coupled to the tip line 20 of the loop circuit. Whenever an induced AC noise signal appears on the tip line 20 such that it flows through the resistor 16, the signal is applied to the base electrode 42 through the capacitor 56 and appears at the output or collector electrode 46 of the transistor 40 at substantially the same magnitude but in inverted or 180° out of phase form from the AC signal at the base electrode 42. The signal at the output electrode 46 is coupled via a balancing resistor 58 and a capacitor 60 to the input or summing terminal 27 of the current sensor 28.

Whenever an AC noise signal is induced on the tip line 20, it is also induced in phase on the ring line 22 and flows through the resistor 24. This AC signal, which is in phase with and equal in magnitude to the AC signal applied to the base electrode 42 of the transistor 40, is coupled to the input terminal 27 of the current sensor 28 by a coupling resistor 62. Since the coupling resistor 62 is equal in magnitude to the sum of the resistor 54, which is essentially the output impedance of the transistor amplifier 40, and the balancing resistor 58, the AC signal coupled to the input terminal 27 through the resistor 62 is equal to but 180° out of phase with the AC signal coupled to the input terminal 27 by the induction cancellation circuit 38 including the balancing resistor 58. Thus, any longitudinal AC voltages including induced noise signals appearing on the tip line 20 and ring line 22 are mixed out of phase at the input terminal 27 such that they cancel and do not affect the operation of the current sensor 28.

On the other hand, if the loop is closed, as by the closing of the switch 12, and a loop current is flowing from the ground terminal 14 to the negative battery terminal 26, a DC biasing potential will be applied to the input terminal 27 through the resistor 62 due to the loop current flowing through the ring line 22 and the resistor 24. In addition, the initial pulse on the tip line 20 of the loop current flowing through the resistor 16 will be applied to the input terminal 27 by the induction cancellation circuit 38. However, since this DC pulse is a differential potential rather than a longitudinal voltage, the potential applied to the input terminal 27 through the resistor 62 and through the induction cancellation circuit 38 will be in phase and supply the input terminal 27 with a relatively high forward biasing potential to a transistor 64 forming the current sensor 28. The forward biasing potential at the input terminal 27 renders the transistor 64 conductive so that a negative operating potential from the negative battery terminal 26 will be supplied to the amplifier/inverter 30 through a resistor 66 and the emitter-collector path of the transistor 64.

Once the loop current is flowing through the resistors 16 and 24, the DC potential at the junction between the resistor 16 and the retard coil 18 will be blocked from the base electrode 42 of the transistor 40 by the DC blocking capacitor 56 and the induction cancellation circuit 38 will cease from supplying forward biasing potential to the input terminal 27 due to the blocking capacitor 60. However, sufficient biasing potential will remain on the input terminal 27 from the ring line 22 supplied through the resistor 62. Thus, as long as the loop current if flowing, the transistor 64 will remain conductive and the amplifier/inverter 30 is supplied with an operating signal.

The circuit component types and values selected for use in constructing the induction cancellation circuit 38 and the current sensor 28 are listed below when a central office negative battery potential of −48 volts is used at the negative battery terminal 26. These values are given by way of example and not by way of limitation, and different applications of the invention would naturally result in the use of different component types and values.

| Reference Number | Component Description | Component Value |
|---|---|---|
| 16 and 24 | Resistors | 56 ohms |
| 40 | PNP Transistor | 2N3645 |
| 48 | Resistor | 10,000 ohms |
| 50 | Resistor | 27,000 ohms |
| 52 and 54 | Resistor | 4,700 ohms |
| 56 | Electrolytic Capacitor | 15 microfarads |
| 58 | Resistor | 910 ohms |
| 60 | Electrolytic Capacitor | 15 microfarads |
| 62 | Resistor | 5,600 ohms |
| 64 | NPN Transistor | 2N3440 |
| 66 | Resistor | 180 ohms |

It should be noted that the resistors 52 and 54 in the above example are of the same value to provide the transistor amplifier 40 with substantially unity gain. Moreover, the output impedance of the transistor 40, which is approximately equal to the total resistance of the resistors 54 and 58, is essentially equal to the resistance of the resistor 62.

Although the present invention is described with reference to one illustrative embodiment thereof, it should be understood that numerous other modifications and embodiments of the invention can be devised by those skilled in the art that will fall within the spirit and scope of the principles of this invention.

What is claimed and desired to be secured by Letters Patent of the United States is:

1. An induction cancellation circuit used in minimizing the effects on a current sensor device of AC longitudinal voltages appearing on a pair of telephone lines, said induction cancellation circuit comprising:
   an amplifier having an input coupled to one of said lines and having an output, said amplifier being biased so as to provide an output signal which is out of phase with any longitudinal voltages applied at said input,
   a first resistor coupling said output to said current sensor, and
   a second resistor coupling said other telephone line to said current sensor device so as to couple said AC longitudinal voltage to said current sensor, said first and second resistors having resistive values such that the output signal coupled to said current sensor through said first resistor is equal to but out of phase with said AC longitudinal voltage coupled to said current sensor by said second resistor.

2. An induction cancellation circuit as set forth in claim 1 wherein a first capacitor couples said input to said one telephone line and a second capacitor is in series relationship with said second resistor.

3. An induction cancellation circuit for use with a pair of telephone lines on which are induced AC signals, said induction cancellation circuit comprising:
   a summing terminal external to said telephone lines,
   an inverting amplifier having an input coupled to one of said telephone lines and having an output, said inverting amplifier converting the phase of said AC signals on said one telephone line substantially 180° so as to supply out of phase signals to said output, a first resistor coupling said out of phase signals from said output to said summing terminal, and a second resistor coupling said AC signals on said other telephone line to said summing terminal such that said out of phase signal and said AC signal substantially cancel each other at said summing terminal.

4. The induction cancellation circuit as set forth in claim 3 wherein said inverting amplifier has an output impedance, said out of phase signals are equal in magnitude to said AC signals, and said second resistor is equal to said first resistor and said output impedance.

5. In combination with a conduction means which is normally in a first state of conduction, which is coupled by a first resistor to one of a pair of telephone lines having AC longitudinal voltages thereon and which is placed in a second state of conduction in response to a loop current flowing on said telephone lines, an induction cancellation circuit comprising:

a second resistor coupled to said conduction means, and an amplifier means coupled to said other telephone line and to said conduction means by said second resistor, said amplifier means providing the conduction means by means of said second resistor with an AC signal equal to but 180° out of phase with the AC signal provided to the conduction means by means of said first resistor.

6. The combination as set forth in claim 5 including a first DC blocking capacitor coupling said amplifier means to said other telephone line, and a second DC blocking capacitor in series relationship with said second resistor.

7. A current sensing circuit including an induction cancellation circuit for use with a pair of telephone lines having induced AC noise signals to sense the presence of a DC loop current flowing on said telephone lines, said current sensing circuit comprising:

a current sensor means external to said telephone lines, said current sensor means receiving an operating signal when said loop current is flowing on said telephone lines, and operating means including amplifier means providing said current sensor with said operating signal, said operating means being coupled to said telephone lines such that the AC noise signals do not affect the production of said operating signal for said current sensor means.

* * * * *

Disclaimer 3,932,713.—*Albert C. Fleuchaus*, Wheeling, and *Paul Shylo*, Norridge, Ill. INDUCTION CANCELLATION CIRCUIT. Patent dated Jan. 13, 1976. Disclaimer filed Aug. 15, 1977, by the inventors and the assignee, *Cook Electric Company*.

Hereby enter this disclaimer to claim 7 of said patent.

[*Official Gazette October 11, 1977.*]